(No Model.)
G. H. BABCOCK.
AIR OR GAS ENGINE.
No. 334,153. Patented Jan. 12, 1886.
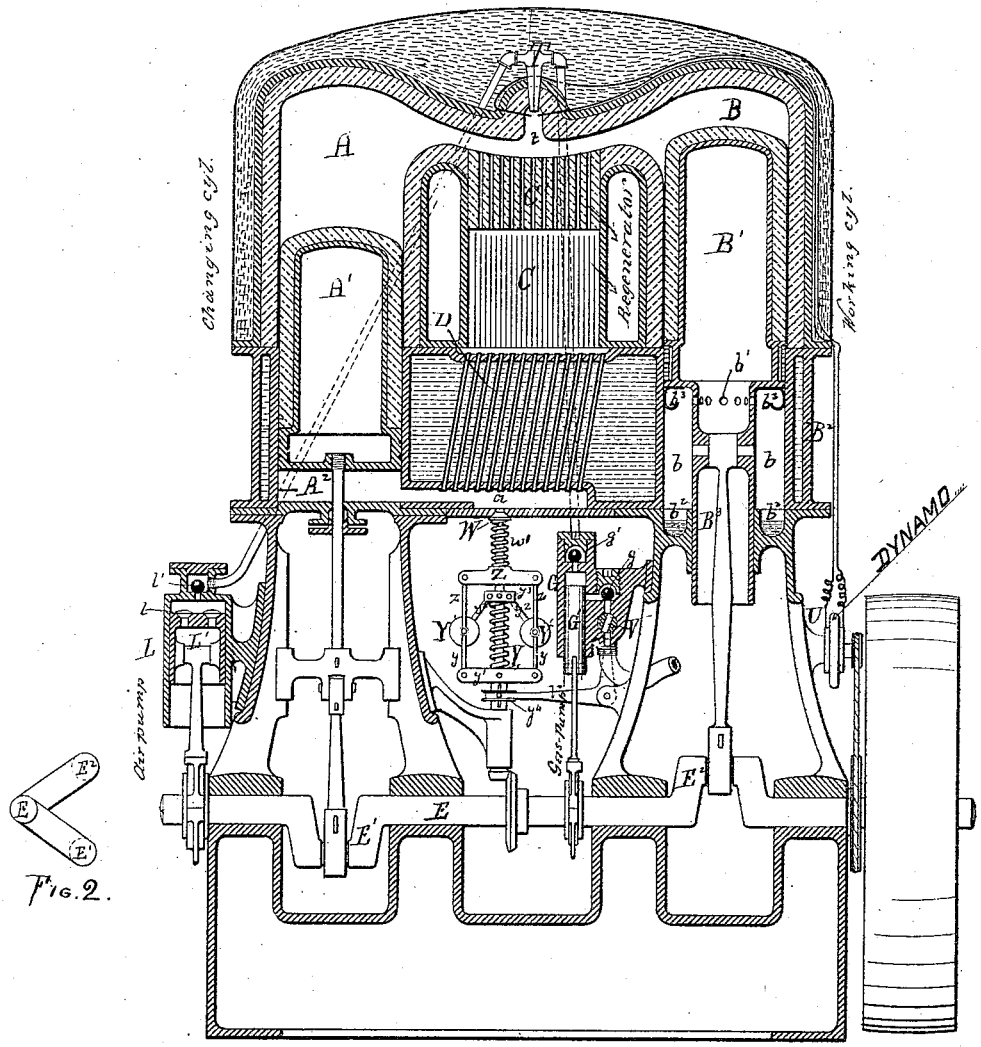
WITNESSES:
INVENTOR
George H Babcock
BY Sydney A. Bennett
his ATTORNEY

UNITED STATES PATENT OFFICE.

GEORGE H. BABCOCK, OF PLAINFIELD, NEW JERSEY.

AIR OR GAS ENGINE.

SPECIFICATION forming part of Letters Patent No. 334,153, dated January 12, 1886.

Application filed April 28, 1884. Serial No. 129,504. (No model.)

*To all whom it may concern:*

Be it known that I, GEORGE H. BABCOCK, of the city of Plainfield, county of Union, and State of New Jersey, have invented certain new and useful Improvements in Air or Gas Engines; and I do hereby declare that the following is a full, clear, and exact description and specification thereof, reference being had to the accompanying drawings.

My invention relates to the same general class of air or gas engines more fully described in an application of mine filed herewith; and it consists, in such engines, of methods and means for producing and supporting combustion within the fluid of the engine, notwithstanding the said fluid may be itself a non-supporter of combustion, by supplying with the combustible a sufficient quantity of oxygen for its combustion; also, in an engine in which the fluid is not exhausted at each stroke, the employment of a compound burner for mingling the combustible with its appropriate supply of oxygen at the point of combustion within the fluid; also, in combination therewith, of means for igniting the combustible within the fluid; also, in such an engine, of means for varying the supply of combustible for the purpose of regulating the power or speed of the engine; also, in certain means for automatically regulating the speed of the engine; also, in improvements in the construction of the regenerator, whereby I am enabled to use higher temperatures than have heretofore been used within an engine of this character, and also in certain details of construction and combinations for the better carrying out of the objects of the invention.

In the drawings, Figure 1 is a vertical section through the engine, showing all the working parts; and Fig. 2 is a detail showing the relative positions of the cranks on the crank-shaft. A is the changing-cylinder, and B the working-cylinder; A', the changing-piston, and B' the working-piston; C and C', the regenerator; D, the refrigerator, and A² and B² the water-jacketed portions of the cylinders, all performing the same functions, and in the same general way, of those described in my other application above referred to, and which in their general combinations and operation are similar to those of other well-known engines of this class, except as hereinafter more specifically described. In this form of my invention, however, the air-pump L and gas-pump G deliver the air and the gas to a compound burner, T, situated within the passage between the changing-cylinder A and the working-cylinder B. This combustion, being similar in effect to the compound blow-pipe, produces an exceedingly high temperature which the ordinary metal surfaces cannot successfully stand, and it is necessary to line the entire interior of the cylinders A and B with a substance not only non-conducting but refractory—fire-brick, for example, or a mixture of plumbago and clay, such as is used for crucibles—capable of withstanding these very high temperatures. I also cover the exterior of the upper ends of the piston A' and B' with a similar refractory material for the same reason. I also make a portion of the regenerator C' of a similar refractory substance, preferably as follows: I mold in a properly-formed mold the fire-clay, or mixture of clay and plumbago, or other refractory material, placing in the same a large number of thin rods of wood, similar to match-splints, practically parallel to each other, so that when the said brick is properly fired these match-splints will be burned, and upon removal of the ash will leave a series of small tubes or passages through the brick, as represented, though other means may be used for producing a highly-porous structure of a refractory character which will admit of the proper passage of the air to and from the different ends of the cylinder A, and perform the functions of a regenerator. Below this portion of the regenerator C', I place the usual metallic plates, C, which serve to take out most of the remaining heat from the air after the more intense heat has been taken up by the refractory portion C'.

For the purpose of igniting the gas or other fuel supplied to the compound burner T, I prefer to employ an electric spark, which may be generated by means of a small dynamo, U, driven from the engine, or by a battery and a Ruhmkorff coil, or other convenient means. After a few revolutions the surfaces of the refractory lining adjacent to the compound burner T will become so highly heated that they will act as igniters for the charge, when, if desired, the electric arrangement may be stopped.

Other well-known means may be employed for igniting the charges.

The air-pump L and the gas or fuel pump

G are shown as driven from the main shaft E by means of an eccentric with a constant throw; but in some instances it may be desirable to have a variable throw to one or both, which may be attained in the manner shown in my other specification above referred to, or by other well-known means.

In order to vary the amount of gas or fuel supplied through the pump G when the same has a constant throw, as shown, I employ a valve, V, in the induction-passage of the said pump, which will admit a greater or less amount of gas into the pump, according as the valve V is less or more closed. I attach this valve, as shown, to the governor through the bell-crank $v$, so that variations in the speed of the engine shall automatically close or open the same, and thus determine the amount of gas admitted to the pump G. The ratio in the sizes of the pumps G and L are such that there will be sufficient air or oxygen supplied by the pump L for the complete combustion of the greatest amount of gas supplied by the pump G. If, therefore, the pump G is caused to supply a less amount of gas, the oxygen supplied by L will be in excess, which fact will be of no serious disadvantage. In the bottom of the passage $a$, connecting with the lower end, $A^2$, of the changing-cylinder, I place a pressure-valve, W, held to its seat by the spring $w'$. The governor Y is of peculiar construction. The balls Y' are attached to nearly vertical levers or arms $y$, hinged to the revolving piece $y'$. Other arms, $y^2$, connect these balls with a sliding collar, $y^3$, upon the governor-shaft in a well-known manner, which is acted upon by a spiral spring to resist the outward motion of the balls. This movable collar $y^3$ is connected through a rod in the hollow shaft with the sliding collar $y^4$, which in turn actuates the bell-crank lever $v$. Other arms, $z$, nearly vertical, connect the balls $y'$ with another sliding collar, Z, on the governor-shaft above the collar $y^3$. The arms $y$ $z$, being nearly vertical, admit of a considerable radial motion to the balls Y' without varying the position materially of the collar Z, but which motion will vary materially the position of the collar $Y^3$, and through it the collar $Y^4$, the bell-crank $v$, and the valve V. The adjustment is such that when this motion has sufficed to close the valve V, or nearly close it, the arms $y$ $z$ have become sufficiently inclined from the vertical to produce a variation in the position of the collar Z, and thereby reduce the pressure of the spring $w$, which holds the valve W to its seat.

The governor Y is shown as driven from the main shaft E by beveled gears; or it may be driven in any other well-known manner.

I prefer to construct the pump G with the induction-passage $g$ considerably below the upper end of the stroke of the plunger G', whereby the lost space in the passage $g$ need not be filled with the gas in its highest compressed condition, and after the plunger G' has passed the port $g$ it will continue to compress the gas in the end of the barrel of the pump G and deliver the same at the pressure within the engine through the valve $g'$. By this arrangement the amount of lost space in the passage G is of less detriment to the proper working of the pump.

It is evident that the pump L may be constructed in a similar manner, though it is not so shown.

I construct the piston B' with a trunk, $B^3$, for the purpose of steadying its motion and guiding it properly, and I connect the annular space $b$, between the trunk $B^3$ and the cylinder $B^2$, with the interior of the said trunk by holes $b'$, so that the air in the annular space $b$ may pass freely out and in as the piston rises and falls without producing any material back-pressure. This air will also serve to keep the said piston B' cool by conveying away the heat which is convected through the piston to the interior.

Below the cylinder $B^2$, I provide an annular oil-space, $b^2$, and attach to the piston B' elastic dependents $b^3$, which at the lowest position of the piston will reach down into the annular oil-space $b^2$ at each revolution, and on the return of the piston carry the oil up and deposit it on the surfaces of the cylinder $B^2$, keeping the latter well lubricated.

Exterior to the cylinders A and B, I place a covering of mineral wool or other non-conductor, and inclose the same in a jacket, as shown, to prevent radiation of the heat from the cylinder.

In the arrangement of this engine I place the hot ends of the cylinders at the top and the cold ends at the bottom, which I am enabled to do in consequence of the use of the internal combustion for heating the air in place of heating the same by convection through the surfaces of the cylinders, as has heretofore been done in engines of this class. By this I attain a specific advantage in preventing the rapid convection of the heat from the hot to the cold ends of the cylinders.

The operation of the engine is as follows: The interior of the cylinders A and B being filled with atmospheric air or other gas at a proper pressure, which may be greater than that of the atmosphere, the revolution of the crank-shaft E draws the piston A' from the top to the bottom of the cylinder A $A^2$, and thereby causes the air from the cold end of $A^2$ of the changing-cylinder to be transferred to the hot end A, through the passage $a$, refrigerator D, and regenerator $c$ $c'$ at the same time that the pumps L and G deliver to the compound burner T a quantity of fuel and oxygen, which, being ignited by the electric spark from the dynamo U, heat up this air to a high temperature, increasing its pressure, and forcing outward the working-piston B', which acts upon the crank $E^2$ to continue its revolution. As the piston B' moves outward and the heated air in A and B expands, the changing plunger or piston A' is caused by the crank E' to return to the upper end of the cylinder A, forcing the air therein down through the regenerator C' C, in which passage the most intense heat of the air is taken up by the refractory portion C' of the regenerator, the less intense is taken up by the part C of said regenerator, and the small remaining portion of heat not so stored up is taken out by the refrigerator D; hence the air passes into the lower end of the changing-cylinder $A^2$ much reduced in temperature and consequently in pressure. The piston B' then returns by the momentum of the fly-wheel, forcing the remaining air in the upper part of the cylinder B also into the lower part of the changing-cylinder $A^2$, storing its heat in its passage, when, by the continued relation of the crank-shaft, the changing-piston A' is again forced to the bottom of its cylinder by the crank E', and the same cycle of operations is repeated. It will be observed as the products of combustion are mingled directly with the fluid within the engine that this fluid rapidly becomes so largely composed of carbonic acid as to be of itself a non-supporter of combustion. This fact has hitherto prevented the use of the products of combustion within an engine of this character; but by supplying a proper amount of oxygen with the fuel at each stroke I am enabled to burn the fuel, notwithstanding it is surrounded by the carbonic acid within the engine. That portion of the gas supplied by the pump G which is hydrogen will, by combination with the oxygen during combustion, produce steam, and this, when it comes in contact with the refrigerator D, will be condensed and fall into the lower portion of the passage $a$. The pump L, if used to pump atmospheric air, will supply with the oxygen a portion of nitrogen, which, together with the carbonic acid of combustion, will increase the amount of fluid in the engine to a small extent at each stroke. If this increase were not checked in any way, it would soon come to be so great as to cause inconvenience. Therefore, the pressure-valve W is provided, which will open when the pressure within the cylinder exceeds a proper limit. The valve W, being in the bottom of the passage $a$, will, when open, deliver first the water which lies within that passage and afterward a portion of the air or gas, until the pressure is brought to the proper standard. When the speed of the engine becomes sufficient to cause the balls Y' of the governor Y to expand against the resistance of the spring, their first motion will be to act upon the bell-crank $v$, closing the valve V, and shutting off to a less or greater extent the amount of gas supplied to the pump G, which will reduce the temperature within the engine, and thereby reduce the power and speed. Should this not be sufficient, however, the still increasing speed will cause the balls Y' to expand still farther, lowering the collar Z, and relieving to some extent the pressure upon the valve W, letting out thereby a portion of the pressure within the engine, thus reducing its power and speed to the proper amount.

The compound burner T may be so made that the passage for the air shall completely surround the passage for the gas or vapor fuel, or in any way by which they may be made to impinge upon each other at the point of issue.

As the object is simply to produce a perfect mixture of the gases just at the point of combustion, I do not desire to limit myself to any particular construction of the burner T. When a hydrocarbon gas or vapor is burned with its proper supply of air, it produces an exceedingly intense flame of the temperature of 5000° and upward. This temperature is of course much too high to admit of use directly in the interior of a gas-engine, and it is only by a mixture of the products of combustion at this temperature with the much larger volume of air or other fluid within the engine that the temperature is brought down to a practicable intensity. It is desirable, for the purposes of economy of power and of attaining a larger power with a smaller engine, that this intensity should be as great as the surfaces of the engine can be made to withstand. It is for this reason that I line all the portions of the interior of my engine which come in contact with the intensely hot gases with a non-conducting refractory substance, whereby I am enabled to use a temperature within the engine greater than any hitherto employed.

It will be noted that no part of the metal work of my engine at any time comes in direct contact with the highly-heated working-fluid. As iron commences to loose its tensile strength at 600° Fahrenheit, and the strength is reduced very rapidly as the temperature rises above that point, the importance of this thorough protection of all parts of the iron-work from the highly-heated gases is apparent, as at times the temperature within the engine may rise to 1000° or 1500° to produce the best effects. Such high temperatures are not desirable or economical in ordinary gas-engines, for the reason that too large a proportion of the heat would be discharged with the exhaust. Neither has it been attainable heretofore in any engine in which the same fluid is alternately heated and cooled, as it has been found impossible to transmit any high temperature through the metallic heaters heretofore employed in such engines.

The firing of an explosive mixture of gas within the cylinder of an engine for the purpose of producing power is a well-known device. My invention differs therefrom in several particulars. Though an explosion within the engine is permissible in some cases, I usually prefer to produce a gradual combustion of the fuel at the point of entrance, and thereby heat other air or gases than those which compose the combustible-mixture, which air or gases are not discharged at each stroke of the engine as in other gas-engines, but are used over and over in the same cylinders. The advantage of this method will be rendered more apparent by a consideration of the fact that a given weight of the products of combustion mingled with the fluid within the engine will heat thirty times its own weight of fluid to 1500°, provided there is but ten per cent. (the amount allowed in practice) of the total heat rejected through the refrigerator D, and fifty times or even a larger proportion provided the temperature within the engine is carried at 1000°, or at a still lower intensity. Should the pump G be used to supply hydrogen and the pump L oxygen only in proper proportions for combustion, the resultant would be, after passing through the refrigerator D, only water, and the fluid in the engine would not be materially increased thereby. In this case the valve W would have no function to perform except to withdraw that water from the passage $a$; but when the pump G supplies a hydrocarbon fuel, or the pump L supplies atmospheric air, then the amount of fluid in the engine will be increased about three per cent. or less at each revolution, and the valve W will be called upon to remove this excess when the power or the speed becomes too great.

It will be found advisable in practice, provided the normal pressure within the engine is above that of the atmosphere, to employ a double engine in which the normal pressures upon the pistons B' may be made to balance each other either by working directly opposite and being connected rigidly, or by working upon opposite cranks of the same shaft, or upon opposite ends of a beam in a well-known manner; but I have preferred to show this engine herein as a single-acting engine for the purpose of simplicity in the drawings, the operation in the double engine being in no wise different from that herein described. The air and gas pumps could, however, be made double-acting in such case advantageously. If the normal pressure within the engine is not greater than that of the atmosphere, it will be possible by using a high temperature, of, say, 1500°, or even less, in the hot end to run a single-acting engine of this character without an excessively large fly-wheel. The operation in that case would be as follows: The normal pressure when the piston B' is at the inner end of its stroke being that of the atmosphere, fifteen pounds and 100° temperature, the changing of the air within the changing-cylinder from the cold to the hot end through the regenerator and addition of heat through the burner T, elevating it to 1500°, would produce a pressure of about fifty pounds, less the reduction due to lost space, which, acting upon the piston B' and through the crank E², would exert a power to cause the shaft E to revolve, when, by the expansion of the fluid, the pressure would fall at the end of the stroke of the piston B' to about twenty-five pounds. When, now, the piston A' returns and forces the air back through the regenerators and the refrigerator, thus cooling the air down to the normal temperature 100°, the pressure within the engine will be less than that of the atmosphere, or about eight pounds, leaving seven pounds pressure acting upon the piston B' to force it back into the cylinder B and exert an additional impulse to the revolution of the engine.

For small powers an engine thus constructed and operated will be found to be simple and efficient.

By the combination of the internally-lined cylinders A and B with a non-conducting material and the external covering of a non-conducting substance, I am enabled to save a very large share of the heat which has heretofore been lost by radiation in air and gas engines. The internal lining and the external covering act in combination, each with the other, for this purpose, as the internal lining, preventing the extreme heat coming in contact with the metal of the cylinders, makes it practicable to protect the exterior of the same from radiation. Where the cylinders are allowed to come in direct contact with the products of combustion, as in gas-engines hitherto, it is necessary to allow of rapid radiation from the exterior thereof, in order to prevent the said cylinders from becoming so highly heated as to be dangerously weak, and it has been estimated that in ordinary gas-engines operated by the explosion of gas within the cylinder fully fifty per cent. of the energy of the heat developed has been thus wasted through the sides of the cylinder. The combination of the internal lining with the external covering enables me to save a large share of this great loss in an engine of the character herein described.

By the arrangement of the hot portion of the engines at the top and the cooler portion at the bottom, as shown, I am enabled to avoid to a large extent the rapid convection of heat from the hot to the cold end, as well as the rapid conveyance of heat by the external currents of heated air passing from the hot to the cold end, which has been a constant source of annoyance and loss to engines as heretofore constructed.

By the combination of the refractory non-conducting lining for the hot end of the cylinder and the water-jacket for the cool end, the reduced amount of heat which it conveyed to the metal of the cylinder through the non-conducting lining, and conducted thereby to the cool end of the cylinder, is readily carried away by the water of the water-jacket, and I am thus enabled to use a very high temperature within the engine without interfering with the proper lubrication of the rubbing-surfaces of the cylinder and piston.

I have filed simultaneously herewith another application (Serial No. 129,574) relating to an engine similar in some respects to that shown and described in this case, and I do not, therefore, wish to be understood as claiming in this application any features of my invention for which I have set up claims in my other case just above referred to.

I do not wish to be understood as claiming the invention described by British Patent No. 2,074 of 1860, relating to an engine in which the combustion takes place in a special combustion-chamber, my invention comprising such an arrangement of the compound burner as will effect the combustion of the gases within the actuating-fluid in the main chamber of the engine and behind the working-piston, as indicated by the claims. Neither do I wish to be understood as claiming in this application the hereinbefore-described method of operating air or gas engines, as this part of my invention will constitute the subject-matter of a future application; but What I do claim, and desire to secure by Letters Patent, is—

1. In an air or gas engine in which the same actuating-fluid is repeatedly heated and cooled, the combination, with a chamber in which the working-piston reciprocates, of a compound burner, substantially as described, arranged to effect the combustion within said chamber behind said piston, whereby the combustible gas or vapor is mingled with a proper supply of air or oxygen at or near the point of combustion which occurs within the working-fluid, and the expansive energy of the heated fluid is communicated directly to the said piston, substantially as set forth.

2. In an air or gas engine in which the same actuating-fluid is repeatedly heated and cooled, the combination, with a chamber in which the working-piston reciprocates, of a compound burner, substantially as described, arranged to effect the combustion within said chamber behind said piston, and an igniter for securing combustion within the actuating-fluid, substantially as set forth.

3. In an air or gas engine in which the same actuating-fluid is repeatedly heated and cooled, the combination, with a chamber in which the working-piston operates, of a compound burner, substantially as described, arranged to effect the combustion within said chamber behind said piston, measuring-vessels operated by the engine for supplying a given amount of combustible gas or vapor and a proportionate amount of air or oxygen at regular intervals, and an igniter for securing combustion within the actuating-fluid, substantially as set forth.

4. In an air or gas engine in which the same actuating-fluid is alternately heated and cooled, the combination of one or more adjustable measuring-vessels, one or more governors for automatically varying the supply of gas or fluid passing through said vessel or vessels, and an igniter for securing combustion within said fluid, substantially as set forth.

5. In an air or gas engine working under a pressure greater than that of the atmosphere, and using the products of combustion within the engine, the combination, with a valve or regulator for the supply passage or pipe for the combustible, of a governor for said valve or regulator adapted to decrease the supply of combustible as the speed of the engine is increased, and a pressure-valve forming a communication between the interior of the engine and the outside atmosphere, said valve being held to its seat by a force which is decreased by the governor only after the supply of combustible is reduced to a minimum, substantially as set forth.

6. In an air or gas engine in which the same actuating-fluid is repeatedly heated and cooled, the combination, with a hot and a comparatively cool cylinder, of a working-piston operating in said hot cylinder, a changing-piston working in said cool cylinder, an air-pump, a gas-pump, and a compound burner, said burner being arranged to produce combustion within the actuating-fluid and behind the said working-piston, substantially as set forth.

7. In an air or gas engine in which the same actuating-fluid is repeatedly heated and cooled, the combination, with a hot and a comparatively cool cylinder, of a working-piston operating in said hot cylinder, a changing-piston working in said cool cylinder, a regenerator, an air-pump, a gas-pump, and a compound burner arranged to produce combustion within the working-fluid and behind the said working-piston, substantially as set forth.

8. In an air or gas engine in which the same actuating-fluid is repeatedly heated and cooled, the combination of the refractory lining to the hot part of the cylinder or cylinders, and a compound burner, substantially as set forth.

9. In an air or gas engine in which the same actuating-fluid is repeatedly heated and cooled, the combination of the refractory lined hot cylinder B, the water-jacketed cool cylinder $A^2$, and the compound burner T, substantially as set forth.

10. In an air or gas engine in which the same actuating-fluid is repeatedly heated and cooled, the combination of the refractory lined hot cylinder B, the externally-cooled cylinder $A^2$, the compound burner T, and a regenerator composed partly or wholly of refractory material, substantially as set forth.

11. In an air or gas engine in which the same actuating-fluid is repeatedly heated and cooled, the combination of the hot cylinder B, the externally-cooled cylinder $A^2$, the regenerator C C', the compound burner T, the air-pump L, the gas-pump G, and the pressure-valve W, substantially as set forth.

12. In an air or gas engine in which the same actuating-fluid is repeatedly heated and cooled, the combination of the hot cylinder B, the externally-cooled cylinder $A^2$, the regenerator, the compound burner, air and gas pumps, the pressure-valve, and the governor, substantially as set forth.

GEO. H. BABCOCK.

Witnesses:
JNO. SCOTT,
CHAS. ELKIN.